United States Patent
Doi et al.

(10) Patent No.: US 12,404,575 B2
(45) Date of Patent: Sep. 2, 2025

(54) HOT-STAMPED PRODUCT

(71) Applicant: NIPPON STEEL CORPORATION, Tokyo (JP)

(72) Inventors: Takashi Doi, Tokyo (JP); Kenji Kobayashi, Tokyo (JP); Naomi Inatomi, Tokyo (JP); Yuki Suzuki, Tokyo (JP); Soshi Fujita, Tokyo (JP); Masahiro Fuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 77 days.

(21) Appl. No.: 18/261,885

(22) PCT Filed: Mar. 14, 2022

(86) PCT No.: PCT/JP2022/011331
§ 371 (c)(1),
(2) Date: Jul. 18, 2023

(87) PCT Pub. No.: WO2022/215448
PCT Pub. Date: Oct. 13, 2022

(65) Prior Publication Data
US 2024/0068080 A1  Feb. 29, 2024

(30) Foreign Application Priority Data
Apr. 5, 2021  (JP) .................... 2021-063851

(51) Int. Cl.
*C23C 2/12* (2006.01)
*C22C 38/00* (2006.01)
(Continued)

(52) U.S. Cl.
CPC .............. *C23C 2/12* (2013.01); *C22C 38/001* (2013.01); *C22C 38/002* (2013.01); *C22C 38/02* (2013.01);
(Continued)

(58) Field of Classification Search
None
See application file for complete search history.

(56) References Cited

U.S. PATENT DOCUMENTS

2004/0244874 A1  12/2004  Nakayama et al.
2016/0362764 A1  12/2016  Sohn et al.
(Continued)

FOREIGN PATENT DOCUMENTS

JP  1988003929 B2  1/1988
JP  2943021 B2  6/1999
(Continued)

*Primary Examiner* — Seth Dumbris
(74) *Attorney, Agent, or Firm* — Greer, Burns & Crain, Ltd.

(57) ABSTRACT

A hot-stamped product with improved delayed-fracture resistance is provided. The hot-stamped product 1 includes: a steel substrate 10; and an Al film 20 formed on the steel substrate 10, the Al film 20 including: an interface layer 21 located at the interface with the steel substrate 10 and with part of the αFe substituted by Al and Si; an intermediate layer 22 formed on the interface layer 21; and an oxide layer formed on the intermediate layer, the intermediate layer 22 including an Fe—Al—Si phase 22a with part of the αFe substituted by Al and Si, the Fe—Al—Si phase 22a including one or more elements selected from the group consisting of Zr, Ce, Y, Ta, Ni, Cu, Nb, Cr, Co, V and Ti, the oxide layer 23 including one or more elements selected from the group consisting of Be, Mg, Ca, Sr, Ba, Sc and Zn.

5 Claims, 2 Drawing Sheets

(51) Int. Cl.
    *C22C 38/02*     (2006.01)
    *C22C 38/04*     (2006.01)
    *C22C 38/06*     (2006.01)
    *C22C 38/14*     (2006.01)
    *C23C 2/28*     (2006.01)
    *C23C 2/40*     (2006.01)

(52) U.S. Cl.
    CPC ............. *C22C 38/04* (2013.01); *C22C 38/06* (2013.01); *C22C 38/14* (2013.01); *C23C 2/28* (2013.01); *C23C 2/40* (2013.01)

(56) References Cited

U.S. PATENT DOCUMENTS

| | | | |
|---|---|---|---|
| 2020/0032360 A1* | 1/2020 | Sengoku | ................. C23C 2/024 |
| 2020/0189233 A1 | 6/2020 | Suzuki et al. | |
| 2020/0255916 A1 | 8/2020 | Banik et al. | |
| 2021/0095368 A1* | 4/2021 | Fujita | ..................... C22C 38/42 |
| 2022/0025498 A1 | 1/2022 | Suzuki et al. | |

FOREIGN PATENT DOCUMENTS

| | | | | |
|---|---|---|---|---|
| JP | 2003034854 A | 2/2003 | | |
| JP | 2007302982 A | 11/2007 | | |
| JP | 4373778 B2 | 11/2009 | | |
| JP | 2017535666 A | 11/2017 | | |
| JP | 2017536472 A | 12/2017 | | |
| WO | 02103073 A2 | 12/2002 | | |
| WO | 2018221738 A1 | 12/2018 | | |
| WO | WO-2019160106 A1 * | 8/2019 | .......... B21D 22/022 | |
| WO | 2020111230 A1 | 6/2020 | | |

* cited by examiner

HOT-STAMPED PRODUCT

TECHNICAL FIELD

The present invention relates to a hot-stamped product.

BACKGROUND ART

One known method of forming a high-strength steel member with high size precision is hot stamping (also referred to as hot pressing, die quenching, press quenching, etc.). Hot stamping involves heating steel material, such as steel sheet, to the austenite region and performing hot forming before cooling the formed material to provide desired properties.

In hot stamping, scale may be produced on the surface of the steel material during heating, and that must be removed by a post-process. A technique to avoid this is known, where steel material to be hot stamped is Al-plated to prevent formation of scale.

JP S63-3929 B2 discloses a method of manufacturing a molten-aluminum-plated steel sheet exhibiting reduced values of the oxidation mass gain during high-temperature oxidation. Japanese Patent No. 2943021 discloses a method of manufacturing an austenitic stainless steel sheet strip having an NiAl intermetallic compound at its surface layer, where the surface of an austenitic stainless steel sheet strip is coated with Al and then diffusion heat treatment is performed in a non-oxidizing atmosphere within a temperature range of 700° C. to 800° C.

WO 2018/221738 A1 discloses a hot-stamped member having good post-coating corrosion resistance. This hot-stamped member includes steel material, an Al—Fe intermetallic compound layer, and an oxide layer, the oxide layer containing one or more elements selected from the group consisting of Be, Mg, Ca, Sr, Ba, Sc, Ti, V, Cr, Mn, Fe, Co, Ni, Cu and Zn in a ratio, excluding oxygen, not lower than 0.01 at. % and not higher than 80 at. %.

JP 2017-536472 A discloses a flat steel product to be hot formed including a steel substrate and a protection film mainly composed of Al. This publication discloses that the protection film contains at least one alkali earth metal or transition metal in a total of 0.1 weight % to 0.5 weight %, where oxides of the alkali earth metal(s) or transition metal(s) are formed on the surface of the protection film during hot forming.

PRIOR ART DOCUMENTS

Patent Documents

Patent Document 1: JP S63-3929 B2
Patent Document 2: Japanese Patent No. 2943021
Patent Document 3: WO 2018/221738 A1
Patent Document 4: JP 2017-536472 A

SUMMARY OF THE INVENTION

Problems to be Solved by the Invention

When an Al-plated steel material is hot stamped, oxygen and water in the atmosphere are consumed during oxidation of Al. Hydrogen emitted during this process may be absorbed in the steel material, potentially causing delayed fracture.

A problem to be solved by the present invention is to provide a hot-stamped product with improved delayed-fracture resistance.

Means for Solving the Problems

A hot-stamped product according to an embodiment of the present invention includes: a steel substrate; and an Al film formed on the steel substrate, the Al film including: an interface layer located at an interface with the steel substrate and having a structure with part of αFe substituted by Al and Si; an intermediate layer formed on the interface layer; and an oxide layer formed on the intermediate layer, a thickness of the intermediate layer being not smaller than 15 µm, the intermediate layer including an Fe—Al—Si phase having a structure with part of αFe substituted by Al and Si, the Fe—Al—Si phase including one or more elements selected from the group consisting of Zr, Ce, Y, Ta, Ni, Cu, Nb, Cr, Co, V and Ti, an Si content of the Fe—Al—Si phase being 1 to 20 mass %, a total content of Zr, Ce, Y, Ta, Ni, Cu, Nb, Cr, Co, V and Ti being 0.10 to 5.0 mass %, the oxide layer including one or more elements selected from the group consisting of Be, Mg, Ca, Sr, Ba, Sc and Zn, a total proportion of Be, Mg, Ca, Sr, Ba, Sc and Zn in a composition of the oxide layer excluding oxygen being 0.01 to 80.0 mass %.

Effects of the Invention

The present invention provides a hot-stamped product with improved delayed-fracture resistance.

EMBODIMENTS FOR CARRYING OUT THE INVENTION

The present inventors conducted a variety of investigations on hydrogen absorption during hot stamping of an Al-plated steel member, particularly an Al—Si plated steel member.

Figure 1:
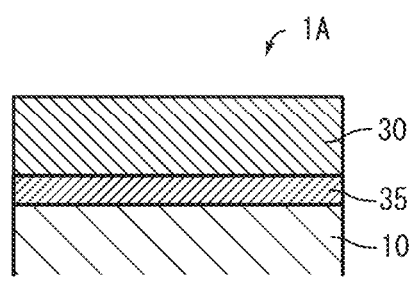
FIG. 1 is a cross-sectional view of a plated steel member prior to hot stamping, schematically illustrating its structure.

FIG. 1 is a cross-sectional view of a plated steel member 1A prior to hot stamping, schematically illustrating its structure. The plated steel member 1A includes a steel substrate 10 and an Al—Si plating layer 30. The plated steel member 1A further includes an Al—Si—Fe alloy layer 35 between the steel substrate 10 and Al—Si plating layer 30, formed by Fe in the steel substrate 10 diffusing into the plating layer.

Figure 2:
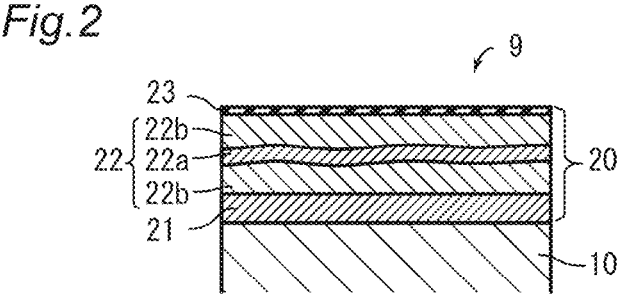
FIG. 2 is a cross-sectional view of an exemplary hot-stamped product formed by hot stamping the plated steel member, schematically illustrating its structure.

FIG. 2 is a cross-sectional view of a hot-stamped product 9, which is an exemplary hot-stamped product formed by hot stamping the plated steel member 1A, schematically illustrating its structure. The hot-stamped product 9 includes the steel substrate 10 and an Al film 20 formed on the steel substrate 10.

The Al film 20 includes a plurality of layers. Specifically, the Al film 20 includes an interface layer 21 located at the interface with the steel substrate 10, an intermediate layer 22 formed on the interface layer 21, and an oxide layer 23 formed on the intermediate layer 22. It is noted that the intermediate layer 22 includes an Fe—Al—Si phase 22a and an Al—Fe phase 22b with different structures, where the Fe—Al—Si phase 22a and Al—Fe phase 22b may be composed of (sub-)layers. Further, the above-stated classification is based on appearance during observation with an optical microscope or a scanning electron microscope (SEM); if observed with a transmission electron microscope (TEM), each layer may be observed as a collection of several crystal phases.

The interface layer 21 is derived from the Al—Si—Fe alloy layer 35 of the plated steel member 1A (FIG. 1), and is mainly structured such that part of the bcc structure of the αFe is substituted by Al and Si. The interface layer 21 may contain an intermediate phase, such as τ phase.

The intermediate layer 22 includes the Fe—Al—Si phase 22a and Al—Fe phase 22b. As is the case with the interface layer 21, the Fe—Al—Si phase 22a is structured such that part of the bcc structure of the αFe is substituted by Al and Si. The Al—Fe phase 22b has a structure of $Fe_4Al_{13}$ and $Fe_2Al_5$. As shown in FIG. 2, the Fe—Al—Si phase 22a typically has the shape of a layer (i.e., band), located in the middle of the intermediate layer 22 as determined along the thickness direction and sandwiched between the upper and lower layers of the Al—Fe phase 22b.

The oxide layer 23 is mainly composed of oxides of Al.

The present inventors discovered that hydrogen absorption by the steel substrate 10 is reduced if the Fe—Al—Si phase 22a contains predetermined amounts of specific elements, specifically one or more of Zr, Ce, Y, Ta, Ni, Cu, Nb, Cr, Co, V and Ti (these eleven elements will be hereinafter referred to as "Group A elements").

Figure 3:
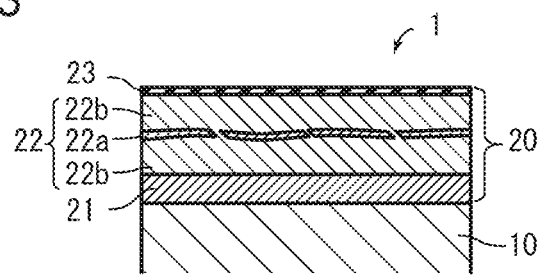
FIG. 3 is a cross-sectional view of a hot-stamped product according to an embodiment of the present invention, schematically illustrating its structure.

FIG. 3 is a cross-sectional view of a hot-stamped product 1, which is an exemplary hot-stamped product where the Fe—Al—Si phase 22a contains predetermined amounts of Group A elements, schematically illustrating its structure. In the hot-stamped product 1, the size of the Fe—Al—Si phase 22a is smaller than in the hot-stamped product 9 (FIG. 2). In the hot-stamped product 9 (FIG. 2), the Fe—Al—Si phase 22a has the shape of a layer (i.e., band), whereas the Fe—Al—Si phase 22a of the hot-stamped product 1 is discontinuous. Further, the Group A elements are selectively distributed in the Fe—Al—Si phase 22a.

This suggests that the Group A elements were selectively distributed in the Fe—Al—Si phase 22a during heating, and also have the effect of reducing stabilization of the Fe—Al—Si phase 22a.

As the Fe—Al—Si phase 22a is prevented from stabilizing, growth of the Al—Fe phase 22b is promoted. As the thickness for the Al—Fe phase 22b increases, Al in the Al film 20 is prevented from diffusing toward its surface, thus reducing oxidation of Al. This reduces hydrogen absorption by the steel substrate 10. Further, as the Al—Fe phase 22b fixes hydrogen atoms, hydrogen absorption by the steel substrate 10 is reduced.

Further, the present inventors discovered that hydrogen absorption by the steel substrate 10 can be further reduced if the oxide layer 23 contains predetermined amounts of one or more of Be, Mg, Ca, Sr, Ba, Sc and Zn (these seven elements will be hereinafter referred to as "Group B elements"). The Group B elements have the property of being oxidized more readily than Al and have the effect of reducing oxidation of Al to reduce hydrogen absorption by the steel substrate 10.

As the Fe—Al—Si phase 22a of the intermediate layer 22 contains predetermined amounts of Group A elements and the oxide layer 23 contains predetermined amounts of Group B elements, their total effect provides a hot-stamped product 1 having improved delayed-fracture resistance.

The present invention was made based on these discoveries. Now, embodiments of the present invention will be described in detail with reference to the drawings. The same or corresponding components in the drawings are labeled with the same reference numerals, and their description will not be repeated. The ratios between the components shown in the drawings do not necessary represent the actual size ratios.

[Hot-Stamped Product]

Returning to FIG. 3, the construction of a hot-stamped product 1 according to an embodiment of the present invention will be described. The hot-stamped product 1 is produced by forming steel material through hot stamping. The hot-stamped product 1 includes a steel substrate 10 and an Al film 20 formed on the steel substrate 10.

The Al film 20 includes an interface layer 21 located at the interface with the steel substrate 10, an intermediate layer 22 formed on the interface layer 21, and an oxide layer 23 formed on the intermediate layer 22.

[Interface Layer]

The interface layer 21 is formed at the interface with the steel substrate 10. The interface layer 21 is structured such that part of the bcc structure of the αFe is substituted by Al and Si.

The chemical composition of the interface layer 21 has a distribution that changes as it goes along the thickness direction. For example, the interface layer 21 has a chemical composition of, in average along the thickness direction: 60 to 98 mass % Fe; 1 to 40 mass % Al; and 1 to 20 mass % Si. The interface layer 21 may contain small amounts of elements other than Si, Fe, and Al. An upper limit for the total content of the elements other than Si, Fe and Al contained in the interface layer 21 is preferably 3.0 mass %, and more preferably 1.5 mass %. In some cases, the border between the interface layer 21 and steel substrate 10 may not be clear; in such cases, the depth range from the interface with the intermediate layer 22 to 10 µm therefrom is treated as the interface layer 21, and the average chemical composition in that range is determined.

The chemical composition of the interface layer 21 may be measured by analyzing a cross section of the Al film 20 using an electron probe micro-analyzer (EPMA) or an energy dispersive spectrometer (EDS) of an SEM.

The interface layer 21 is not limited to any particular thickness, and may be 5 to 15 µm thick, for example.

[Intermediate Layer]

The intermediate layer 22 is formed on the interface layer 21. The intermediate layer 22 includes an Fe—Al—Si phase 22a and an Al—Fe phase 22b. As is the case with the interface layer 21, the Fe—Al—Si phase 22a is structured such that part of the bcc structure of the αFe is substituted by Al and Si. The Al—Fe phase 22b has a structure of $Fe_4Al_{13}$ and $Fe_2Al_5$. Solute Si may be present in the Al—Fe phase 22b, too.

The Fe—Al—Si phase 22a and Al—Fe phase 22b may be identified by analyzing the chemical composition at a cross section of the Al film 20 using an EPMA or an EDS of an SEM. The Fe—Al—Si phase 22a and Al—Fe phase 22b may also be identified by analyzing the crystal structure through X-ray diffraction or electron diffraction.

Although the interface layer 21 and Fe—Al—Si phase 22a have similar structures, these two can be distinguished based on position. Specifically, the interface layer 21 is located at the interface with the steel substrate 10, whereas the Fe—Al—Si phase 22a is located in the middle of the intermediate layer 22 along the thickness direction.

The Si content of the Fe—Al—Si phase 22a is 1 to 20 mass %. If the Si content is lower than 1 mass %, the oxide layer 23 grows, which increases the amount of hydrogen that is absorbed in the steel substrate 10. If the Si content is higher than 20 mass %, the intermediate layer 22 does not grow sufficiently, which, too, increases the amount of hydrogen that is absorbed in the steel substrate 10. A lower limit for the Si content of the Fe—Al—Si phase 22a is preferably 5 mass %, and more preferably 8 mass %. An upper limit for the Si content of the Fe—Al—Si phase 22a is preferably 18 mass %, and more preferably 16 mass %.

The Fe content of the Fe—Al—Si phase 22a is not limited to any particular value, and may be 30 to 80 mass %, for example. The Al content of the Fe—Al—Si phase 22a is not limited to any particular value, and may be 5 to 50 mass %, for example.

In addition to Fe, Al and Si, the Fe—Al—Si phase 22a contains one or more elements selected from the group consisting of Zr, Ce, Y, Ta, Ni, Cu, Nb, Cr, Co, V and Ti. The eleven elements Zr, Ce, Y, Ta, Ni, Cu, Nb, Cr, Co, V and Ti will be hereinafter referred to as Group A elements. Preferable Group A elements are Zr, Ce, Ni, Cr, Co, V and Ti, and particularly preferable ones are Ni and Cr.

The total content of the Group A elements in the Fe—Al—Si phase 22a is 0.10 to 5.0 mass %. The Group A elements reduce stabilization of the Fe—Al—Si phase 22a to promote growth of the Al—Fe phase 22b, thereby reducing hydrogen absorption by the steel substrate 10. This effect is not sufficiently produced if the total content of the Group A elements is lower than 0.1 mass %. On the other hand, if the total content of the Group A elements is higher than 5.0 mass %, the Fe—Al—Si phase 22a may become oversized. A lower limit for the total content of the Group A elements in the Fe—Al—Si phase 22a is preferably 0.20 mass %, and more preferably 0.30 mass %. An upper limit for the content of the Group A elements in the Fe—Al—Si phase 22a is preferably 4.0 mass %, and more preferably 3.0 mass %.

The Fe—Al—Si phase 22a may contain small amounts of elements other than Si, Fe, Al and the Group A elements. An upper limit for the total content of the elements other than Si, Fe, Al and the Group A elements contained in the Fe—Al—Si phase 22a is preferably 1.0 mass %, and more preferably 0.5 mass %.

As is the case with the interface layer 21, the chemical composition of the Fe—Al—Si phase 22a may be measured by analyzing a cross section of the Al film 20 using an EPMA or an EDS of an SEM. Specifically, the content of a given element is measured at a plurality of locations, and the average is treated as the content of this particular element. The chemical composition of the Al—Fe phase 22b discussed below can be measured by the same method.

The Al—Fe phase 22b is not limited to any particular chemical composition, and may have a composition of, for example, 15 to 70 mass % Fe, 30 to 85 mass % Al, and 0 to 20 mass % Si. As discussed above, the Al—Fe phase 22b basically has a structure of $Fe_4Al_{13}$ and $Fe_2Al_5$, however, solute Si may be present. The Al—Fe phase 22b may contain small amounts of elements other than Si, Fe, and Al. An upper limit for the total content of the elements other than Si, Fe, and Al contained in the Al—Fe phase 22b is preferably 1.0 mass %, and more preferably 0.5 mass %.

The area ratio of the Fe—Al—Si phase 22a in the intermediate layer 22 is preferably 5 to 35%. There is a tendency that the lower the area ratio of the Fe—Al—Si phase 22a in the intermediate layer 22, the better hydrogen absorption by the steel substrate 10 will be reduced. An upper limit for the area ratio of the Fe—Al—Si phase 22a in the intermediate layer 22 is more preferably 30%, and yet more preferably 25%.

In addition to the Fe—Al—Si phase 22a and Al—Fe phase 22b, the intermediate layer 22 may include small amounts of other phases. An example of a phase other than the Fe—Al—Si phase 22a and Al—Fe phase 22b is τ phase. The area ratio of the phases other than the Fe—Al—Si phase 22a and Al—Fe phase 22b in the intermediate layer 22 is preferably not higher than 10.0%, and more preferably not higher than 5.0%.

The thickness of the intermediate layer 22 is not smaller than 15 μm. The larger the thickness of the intermediate layer 22, the better diffusion of Al in the Al film 20 toward its surface will be reduced such that oxidation of Al will be better reduced. Furthermore, hydrogen can be fixed in the intermediate layer 22 more easily. Thus, there is a tendency that the larger the thickness of the intermediate layer 22, the better hydrogen absorption by the steel substrate 10 will be reduced. Further, there is a tendency that the larger the thickness of the intermediate layer 22, the better coating adhesiveness and corrosion resistance. A lower limit for the thickness of the intermediate layer 22 is preferably 20 μm, and more preferably 25 μm. An upper limit for the thickness of the intermediate layer 22 is not limited to a particular value, and may be 50 μm, for example.

[Oxide Layer]

The oxide layer 23 is formed on the intermediate layer 22. The oxide layer 23 is mainly composed of oxides of Al. The oxide layer 23 may contain elements other than Al and O. The oxide layer 23 may contain, for example, Si, Fe, and Group A elements discussed above.

The oxide layer 23 further includes one or more elements selected from the group consisting of Be, Mg, Ca, Sr, Ba, Sc and Zn. The seven elements Be, Mg, Ca, Sr, Ba, Sc and Zn will be hereinafter referred to as Group B elements. Preferable Group B elements are Mg, Ca, Sr and Ba, and a particularly preferable one is Mg. The group B elements are preferably present as oxides.

The total proportion of the Group B elements in the composition of the oxide layer 23 excluding oxygen (hereinafter simply referred to as "proportion of the Group B elements") is to be 0.01 to 80.0 mass %. The Group B elements have the property of being oxidized more readily than Al, and has the effect of reducing oxidation of Al to reduce hydrogen absorption by the steel substrate 10. This effect is not sufficiently produced if the proportion of the Group B elements is lower than 0.01 mass %. If the proportion of the Group B elements is higher than 80.0 mass %, the thickness of the oxide layer 23 may increase. A lower limit for the proportion of the Group B elements is preferably 1.0 mass %, more preferably 3.0 mass %, yet more preferably 10 mass %, and still more preferably 15 mass %. An upper limit for the proportion of the Group B elements is preferably 60.0 mass %, more preferably 40.0 mass %, and yet more preferably 35 mass %.

As is the case with the interface layer 21 and intermediate layer 22, the chemical composition of the oxide layer 23 may be measured by analyzing a cross section of the Al film 20 using an EPMA or an EDS of an SEM. It is also possible with an EDS of a TEM. The chemical composition of the oxide layer 23 may also be measured through depth-wise composition analysis with a glow discharge spectrometer (GDS) or by Auger electron spectroscopic analysis (AES).

The thickness of the oxide layer 23 is preferably 0.01 to 1.00 μm. There is a tendency that the smaller the thickness of the oxide layer 23, the better hydrogen absorption by the steel substrate 10 will be reduced. An upper limit for the thickness of the oxide layer 23 is preferably 0.50 μm, and more preferably 0.30 μm.

The interface between the oxide layer 23 and intermediate layer 22 can be determined by observing the distribution of oxygen concentration. In some of the present embodiments, a GDS is used and the position at which the detection intensity for oxygen is as low as ⅙ of the maximum is determined to be the interface between the oxide layer 23 and intermediate layer 22.

Particularly preferable combinations of a Group A element and a Group B element are a combination of Ni and Mg and a combination of Cr and Mg. That is, it is particularly preferable that the Fe—Al—Si phase 22a includes one or two elements selected from the group consisting of Ni and Cr, the total content of Ni and Cr in the Fe—Al—Si phase 22a is 0.10 to 5.0 mass %, the oxide layer 23 includes Mg, and the proportion of Mg in the composition of the oxide layer 23 excluding oxygen is 0.01 to 80.0 mass %.

[Steel Substrate]

The steel substrate 10 is not limited to any particular steel as long as it is suitable for hot stamping. Examples of substrate steels that can be used in the hot-stamped product 1 include steels having a chemical composition of, in mass %: 0.1 to 0.6% C; 0.01 to 0.60% Si; 0.50 to 3.00% Mn; up to 0.05% P; up to 0.020% S; up to 0.10% Al; 0.01 to 0.10% Ti; 0.0001 to 0.0100% B; up to 0.010% N; 0 to 1.0% Cr; 0 to 1.0% Mo; 0 to 1.0% Cu; 0 to 1.0% Ni; and the balance Fe and impurities. Examples of forms of the steel substrate prior to hot stamping include steel sheet such as hot-rolled steel sheet and cold-rolled steel sheet. The chemical composition of the steel substrate 10 will be described below. In the following description, "%" for the content of an element means mass %.

C: 0.1 to 0.6%

Carbon (C) is included in steel to ensure that it has the intended mechanical strength. If C content is too low, a sufficient improvement in mechanical strength may not be provided. On the other hand, if C content is too high, elongation or reduction of area can easily decrease. An upper limit for C content is more preferably 0.4%.

Si: 0.01 to 0.60%

Silicon (Si) is an element that improves mechanical strength and, similar to C, is included in steel to ensure that it has the intended mechanical strength. If Si content is too low, a sufficient improvement in mechanical strength may not be provided. On the other hand, if Si content is too high, Si oxides formed at the surface layer of the steel substrate may effect a decrease in wettability during plating and thus leaving some portions unplated.

Mn: 0.50 to 3.00%

Manganese (Mn) is one of the elements that strengthen steel, i.e., strengthening elements, and is also one of the elements that enhance hardenability. Mn is also effective in reducing hot shortness caused by S, which is an impurity. These effects may not be sufficiently produced if Mn content is too low. On the other hand, if Mn content is too high, an excessive amount of residual austenite may result, leading to decreased strength.

P: Up to 0.05%

Phosphorus (P) is an impurity contained in a steel substrate. P contained in the steel substrate may segregate on the crystal grain boundaries of the steel substrate and thus decrease the toughness of the steel substrate. It is preferable to keep P content as low as possible.

S: Up to 0.020%

Sulfur (S) is an impurity contained in a steel substrate. S contained in the steel substrate may form sulfides and decrease the toughness of the steel substrate. It is preferable to keep S content as low as possible.

Al: Up to 0.10%

Aluminum (Al) is typically used to deoxidize steel. However, if Al content is high, the $Ac_3$ point of the steel substrate rises, which requires an increase in the heating temperature during hot stamping to ensure hardenability of the steel. In view of this, Al content is preferably not higher than 0.10%. Al content is more preferably not higher than 0.05%, and yet more preferably not higher than 0.01%.

Ti: 0.01% to 0.10%

Titanium (Ti) is one of the elements that increase strength. The effects of improving strength and oxidation resistance may not be sufficiently produced if Ti content is too low. On the other hand, if Ti content is too high, carbides and/or nitrides may be formed, softening the steel.

B: 0.0001 to 0.0100%

Boron (B) has the effect of acting during quenching to increase strength. The effect of improving strength may not be sufficiently produced if B content is too low. On the other hand, if B content is too high, inclusions may be formed, embrittling the steel substrate and decreasing its fatigue strength.

N: Up to 0.010%

Nitrogen (N) is an impurity contained in a steel substrate. N contained in the steel substrate may form nitrides and decrease the toughness of the steel substrate. Further, N contained in the steel substrate may combine with B and thus decrease the amount of solute B, decreasing B's effect of improving hardenability. It is preferable to keep N content as low as possible.

The steel substrate 10 may also contain Cr, Mo, Cu and Ni.

Cr: 0 to 1.0%
Mo: 0 to 1.0%
Cu: 0 to 1.0%
Ni: 0 to 1.0%

To improve the hardenability of the steel substrate, one or more elements selected from the group consisting of chromium (Cr), molybdenum (Mo), copper (Cu), and nickel (Ni) may be included. A preferred lower limit for the content of each of these elements is 0.01%. On the other hand, if excessive amounts are included, saturation will be reached in terms of effect, increasing costs.

The balance of the chemical composition of the steel substrate 10 is Fe and impurities. Impurity as used herein means an element originating from ore or scrap used as raw material for steel or an element that has entered from the environment or the like during the manufacturing process. Examples of impurities other than the elements listed above are Zn, Co, Sn, Nb, V, As, Zr, Ca, and Mg.

[Method of Manufacturing Hot-Stamped Product]

Next, an exemplary method of manufacturing a hot-stamped product 1 will be described. The manufacturing method described below involves plating steel material, such as steel sheet, with Al to produce a plated steel member, and hot stamping the plated steel member to form an Al film 20 on the steel substrate 10. The method described here is an illustrative example, and does not limit the method of manufacturing a hot-stamped product 1.

[Plating Step]

Hot dipping is used to form a plating layer on the surface of steel material. The temperature of the plating bath is preferably 600 to 700° C. If the temperature of the plating bath is lower than 600° C., the plating bath has low viscosity, making uniform plating difficult. If the temperature of the plating bath is higher than 700° C., volatilization occurs to change the composition in a short period of time, making the process management difficult.

The addition of Group A elements is performed by adding them to the plating bath. The content of the Group A elements in the plating bath is preferably 0.05 to 5.0 mass %. There is a tendency that the higher the content of the Group A elements in the plating bath, the higher the content of the Group A elements in the Fe—Al—Si phase 22a. A lower limit for the content of the Group A elements in the plating bath is more preferably 0.2 mass %, and yet more preferably 0.5 mass %. An upper limit for the content of the Group A elements in the plating bath is more preferably 3.0 mass %, and yet more preferably 2.0 mass %.

The addition of Group B elements is also performed by adding them to the plating bath. If Group B elements are to be added, the content of the Group B elements in the plating bath is preferably 0.01 to 1.0 mass %. There is a tendency that the higher the content of the Group B elements in the plating bath, the higher the content of the Group B elements in the oxide layer 23. A lower limit for the content of the Group B elements in the plating bath is more preferably 0.05 mass %, and yet more preferably 0.08 mass %. An upper limit for the content of the Group B elements in the plating bath is more preferably 0.8 mass %, and yet more preferably 0.6 mass %.

The Si content of the plating bath is 1.0 to 20.0 mass %, for example. The balance of the plating bath is mainly Al. The plating bath may contain small amounts of elements other than Al, Si and the Group A and B elements. The total contained of the elements other than Al, Si and the Group A and B elements contained in the plating bath is preferably not higher than 5.0 mass %, more preferably not higher than 3.0 mass %, yet more preferably not higher than 2.0 mass %, and still more preferably not higher than 1.0 mass %.

The steel material is held in a hydrogen reduction atmosphere at 700 to 800° C. before being immersed in the plating bath. It is preferable to perform the entire process in a non-oxidizing atmosphere. The plating is preferably such that the resulting thickness of the plating layer is 20 to 30 μm. The thickness of the plating layer is adjusted such that the thickness of the intermediate layer 22 after the step of hot stamping is not smaller than 15 μm. The thickness of the plating layer can be adjusted by regulating the temperature and viscosity of the plating bath, immersion time, and/or gas blowing.

[Hot-Stamping Step]

The plated steel member is shaped to the required size before being hot stamped. The heating may be performed in a hot-temperature furnace or through electrical heating. The rate of temperature increase may be 1 to 50° C./s, for example. It is preferable that the retention temperature is 850 to 950° C. and it is preferable that the holding time is not shorter than 2 minutes. The rate of temperature decrease (i.e., cooling) may be 30 to 1000° C./s, for example.

If the holding time is too long, the crystal structure of the intermediate layer may change. An upper limit for the holding time is preferably 30 minutes, and more preferably 10 minutes.

The above-described process results in the hot-stamped product 1. Although a method of hot stamping a plated steel member has been described, a hot-stamped product 1 may be produced by using vapor deposition or spraying to cause Al and/or other elements to adhere to the surface of the steel substrate 10 to form an Al coating layer, and then hot stamping this steel substrate 10 having the Al coating layer.

These embodiments provide a hot-stamped product with improved delayed-fracture resistance.

EXAMPLES

Now, the present invention will be described more specifically with reference to examples. The present invention is not limited to these examples.

Steel sheets having the chemical compositions shown in Table 1 were prepared, and each of the steel sheets was subjected to hot dipping to form an Al—Si plating layer on each side thereof.

TABLE 1

| Steel No. | Chemical composition (in mass %, balance Fe and impurities) | | | | | | | | |
|---|---|---|---|---|---|---|---|---|---|
| | C | Si | Mn | P | S | Al | Ti | B | N |
| S1 | 0.1 | 0.21 | 1.21 | 0.02 | 0.005 | 0.05 | 0.02 | 0.0030 | 0.005 |
| S2 | 0.4 | 0.01 | 1.01 | 0.04 | 0.010 | 0.03 | 0.04 | 0.0022 | 0.004 |

The plating baths used had the chemical compositions shown in Table 2. The temperature of the plating baths, during hot dipping was 700° C. After each steel sheet was immersed in the associated plating bath, the amount of adhesion was adjusted by gas wiping to 70 g/m 2 for each side.

TABLE 2

| Lable | Steel No. | Chemical composition of plating bath (in mass %, balance Al and impurities) | | |
|---|---|---|---|---|
| | | Si | Group A elements | Group B elements |
| A01 | S1 | 10.0 | Co: 0.20 | Ca: 0.10 |
| A02 | S2 | 10.0 | Zr: 1.00 | Mg: 0.1 |
| A03 | S1 | 10.0 | Ni: 2.00 | Ba: 0.1 |
| A04 | S2 | 10.0 | Co: 1.00 | Sr: 0.1 |
| A05 | S1 | 10.0 | V: 0.05 | Mg: 0.05 |
| A06 | S2 | 10.0 | V: 0.50 | — |
| A07 | S1 | 10.0 | Nb: 0.50 | — |
| A08 | S2 | 10.0 | Nb: 2.00 | — |
| A09 | S1 | 10.0 | Y: 0.10 | — |
| A10 | S2 | 10.0 | Cr: 0.50 | Mg: 0.10 |
| A11 | S1 | 10.0 | Ni: 2.00 | — |
| A12 | S2 | 10.0 | Cr: 1.00 | Ca: 0.05 |
| A13 | S1 | 10.0 | Ni: 0.50 | Mg: 0.10 |
| A14 | S1 | 10.0 | Cu: 1.00 | — |
| A15 | S1 | 10.0 | Ce: 0.20 | Mg: 0.05 |
| A16 | S2 | 10.0 | Ta: 0.50 | — |
| A17 | S2 | 10.0 | Ti: 0.50 | Ca: 0.05 |
| a1 | S1 | 10.0 | — | — |
| a2 | S1 | 10.0 | Zr: 0.005 | — |
| a3 | S1 | 10.0 | — | Mg: 0.60 |
| a4 | S1 | 10.0 | Y: 0.05 | Ca: 0.50 |
| a5 | S2 | 10.0 | — | Ca: 0.005 |
| a6 | S2 | 10.0 | Co: 0.005 | — |
| a7 | S2 | 10.0 | Ni: 7.00 | — |

The plated steel sheet was heated in an electric resistance furnace at a furnace temperature of 900° C. under a synthetic-air flow with a dew point of 20° C. in such a manner that the soaking time was five minutes. Thereafter, the sheet was formed in a die and, at the same time, cooled in the die to provide a hot-stamped product.

The resulting hot-stamped products were examined for the Si content of the Fe—Al—Si phase, the content of the Group A elements in the Fe—Al—Si phase, the area ratio of the Fe—Al—Si phase in the intermediate layer, the thickness of the intermediate layer, the proportion of the Group B elements in the composition of the oxide layer excluding oxygen, and the thickness of the oxide layer. Further, the following properties were evaluated: hydrogen embrittlement resistance (i.e., delayed-fracture resistance), coating adhesiveness, post-coating corrosion resistance, and pitting resistance.

[Hydrogen Embrittlement Resistance]

The resulting hot-stamped products were analyzed for hydrogen. The hydrogen analysis was performed by temperature-programmed desorption, where diffusible hydrogen was defined as hydrogen emitted until 250° C. was reached and a score was given based on its amount in accordance with the following criteria:
2: amount of diffusible hydrogen smaller than 0.1 mass ppm
1: amount of diffusible hydrogen not smaller than 0.1 mass ppm and smaller than 0.2 mass ppm
0: amount of diffusible hydrogen not smaller than 0.2 mass ppm

[Coating Adhesiveness]

Coating adhesiveness was evaluated in accordance with the method disclosed in Japanese Patent No. 4373778. That is, each specimen was immersed in deionized water at 60° C. for 240 hours before a grid was cut therein using a cutter, with a distance of 1 mm between adjacent cuts and having 100 squares, and the number of squares in the peeled region was visually measured to calculate the area ratio, based on which a score was given in accordance with the following criteria:
3: area of peeling of 0% or larger but smaller than 10%
2: area of peeling not smaller than 10% and smaller than 70%
1: area of peeling not smaller than 70% up to 100%

[Post-Coating Corrosion Resistance]

Corrosion resistance after coating was evaluated by the method specified by JASO M609 established by the Society of Automotive Engineers of Japan, Inc. The coating was scratched using a cutter; after 180 cycles of corrosion testing, the width with coating expansion as measured from a scratch (the maximum on a single side) was measured; and a score was given in accordance with the following criteria:
3: width with expansion of 0 mm or larger but smaller than 1.5 mm
2: width with expansion not smaller than 1.5 mm and smaller than 3.0 mm
1: width with expansion not smaller than 3.0 mm

[Pitting Resistance]

Each specimen was immersed in the PREPALENE-X surface conditioner from Nihon Parkerizing Co., Ltd. for one minute at room temperature, before being immersed in the PALBOND SX35 coating substrate formation agent from the same company for two minutes at 35° C. Thereafter, the specimen was subjected to combined cyclic corrosion testing by the method specified by JIS H 8502. The specimen was coated with POWERFLOAT 1200 from Nippon Paint Co., Ltd. to a thickness of 15 μm, and cut using a cutter as specified in JIS H 8502. A score was given based on the amount of reduction in the sheet thickness of the steel sheet after 60 cycles, measured at cut portions, in accordance with the following criteria:
5: amount of reduction in sheet thickness smaller than 0.1 mm
4: amount of reduction in sheet thickness not smaller than 0.1 mm and smaller than 0.2 mm
3: amount of reduction in sheet thickness not smaller than 0.2 mm and smaller than 0.3 mm
2: amount of reduction in sheet thickness not smaller than 0.3 mm and smaller than 0.4 mm
1: amount of reduction in sheet thickness not smaller than 0.4 mm The results are shown in Table 3.

TABLE 3

| | Intermediate Layer | | | | Oxide Layer | | | | | | |
|---|---|---|---|---|---|---|---|---|---|---|---|
| | Si content of Fe—Al—Si phase | Content of Group A elements in Fe—Al—Si phase | Area ratio of Fe—Al—Si phase | Thickness | Proportion of Group B elements | Thickness | Evaluation | | | | |
| Lable | (mass %) | (mass %) | (%) | (μm) | (mass %) | (μm) | E1* | E2* | E3* | E4* | Total |
| A01 | 14 | 0.1 | 20 | 20 | 20.0 | 0.15 | 2 | 3 | 2 | 4 | 11 |
| A02 | 15 | 0.5 | 15 | 21 | 25.0 | 0.18 | 2 | 3 | 3 | 5 | 13 |
| A03 | 15 | 1.5 | 10 | 25 | 20.0 | 0.15 | 2 | 3 | 3 | 5 | 13 |
| A04 | 15 | 0.2 | 15 | 25 | 15.0 | 0.15 | 2 | 3 | 3 | 5 | 13 |
| A05 | 12 | 0.1 | 25 | 20 | 20.0 | 0.15 | 2 | 3 | 3 | 3 | 11 |
| A06 | 15 | 0.5 | 20 | 23 | — | 0.15 | 1 | 3 | 3 | 3 | 10 |
| A07 | 12 | 0.2 | 25 | 20 | — | 0.10 | 1 | 3 | 3 | 4 | 11 |
| A08 | 13 | 0.5 | 15 | 23 | — | 0.20 | 1 | 3 | 3 | 3 | 10 |
| A09 | 10 | 0.1 | 30 | 20 | — | 0.15 | 1 | 3 | 3 | 5 | 12 |
| A10 | 15 | 0.5 | 15 | 25 | 25.0 | 0.18 | 2 | 3 | 3 | 5 | 13 |
| A11 | 15 | 2.0 | 10 | 30 | — | 0.20 | 1 | 3 | 3 | 5 | 12 |
| A12 | 15 | 1.0 | 15 | 25 | 15.0 | 0.22 | 2 | 3 | 3 | 5 | 13 |
| A13 | 16 | 1.0 | 15 | 30 | 20.0 | 0.20 | 2 | 3 | 3 | 5 | 13 |
| A14 | 14 | 1.0 | 15 | 23 | — | 0.15 | 1 | 3 | 3 | 5 | 12 |
| A15 | 11 | 0.1 | 20 | 20 | 20.0 | 0.15 | 2 | 3 | 3 | 4 | 11 |
| A16 | 13 | 0.2 | 15 | 25 | — | 0.30 | 1 | 3 | 1 | 5 | 12 |
| A17 | 15 | 0.3 | 10 | 23 | 20.0 | 0.25 | 2 | 3 | 1 | 5 | 13 |
| a1 | 10 | — | 40 | 20 | — | 0.32 | 0 | 2 | 1 | 2 | 5 |
| a2 | 12 | <0.01 | 38 | 20 | — | 0.35 | 0 | 3 | 1 | 2 | 6 |
| a3 | 10 | — | 40 | 20 | 82.0 | 0.35 | 0 | 2 | 1 | 2 | 5 |

TABLE 3-continued

| | Intermediate Layer | | | | Oxide Layer | | | | | | |
|---|---|---|---|---|---|---|---|---|---|---|---|
| | | Content of Group A | | | | | | | | | |
| | Si content of Fe—Al—Si phase | elements in Fe—Al—Si phase | Area ratio of Fe—Al—Si phase | Thickness | Proportion of Group B elements | Thickness | | Evaluation | | | |
| Lable | (mass %) | (mass %) | (%) | (μm) | (mass %) | (μm) | E1* | E2* | E3* | E4* | Total |
| a4 | 12 | 0.05 | 38 | 25 | 65.0 | 1.00 | 0 | 3 | 1 | 2 | 6 |
| a5 | 12 | — | 38 | 20 | <0.01 | 0.30 | 0 | 1 | 1 | 2 | 4 |
| a6 | 10 | <0.01 | 38 | 20 | — | 0.30 | 0 | 1 | 1 | 2 | 4 |
| a7 | 7 | 5.5 | 40 | 15 | — | 0.30 | 0 | 1 | 1 | 2 | 4 |

E1*: Hydrogen embrittlement resistance
E2*: Coating adhesiveness
E3*: Post-coating corrosion resistance
E4*: Pitting resistance As shown in Table 3, for each of the hot-stamped products labeled A01 to A17, the Si content of the Fe—Al—Si phase was in the range of 1 to 20 mass %, and the content of Group A elements was in the range of 0.10 to 5.0 mass %. For each of these hot-stamped products, the amount of diffusible hydrogen in hydrogen-embrittlement resistance testing was smaller than 0.2 mass ppm. These hot-stamped products had good coating adhesiveness, post-coating corrosion resistance and pitting resistance. For the hot-stamped products labeled A01 to A05, A10, A12, A13, A15 and A17 in which the oxide layer contained Group B elements, the amount of diffusible hydrogen in hydrogen embrittlement resistance testing was smaller than 0.1 mass ppm, which means particularly good hydrogen embrittlement resistance (i.e., delayed-fracture resistance).

For each of the hot-stamped products labeled a1 to a7, the amount of diffusible hydrogen in hydrogen embrittlement resistance testing was not smaller than 0.2 mass ppm, which means that they had a lower hydrogen embrittlement resistance (delayed-fracture resistance) than the hot-stamped products labeled A01 to A20. This is presumably because, for the hot-stamped products labeled a1 to a7, the content of the Group A elements in the Fe—Al—Si phase was either lower than 0.1 mass % or higher than 5.0 mass %.

Figure 4:
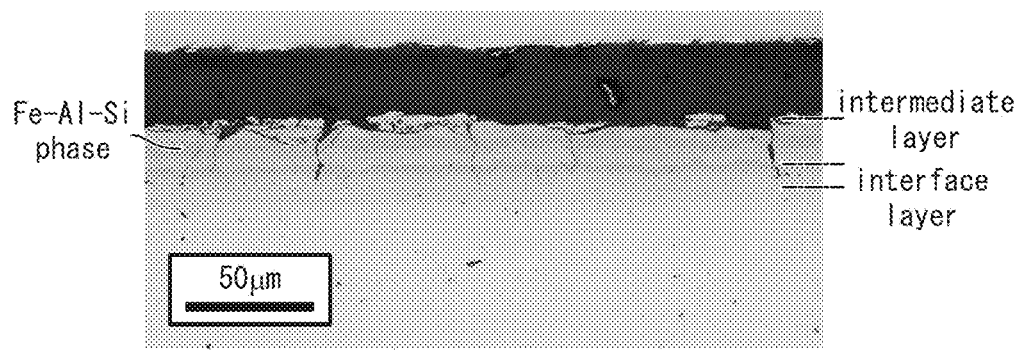
FIG. 4 is a photograph showing a cross section of the Al film of a product labeled a1.
Figure 5:
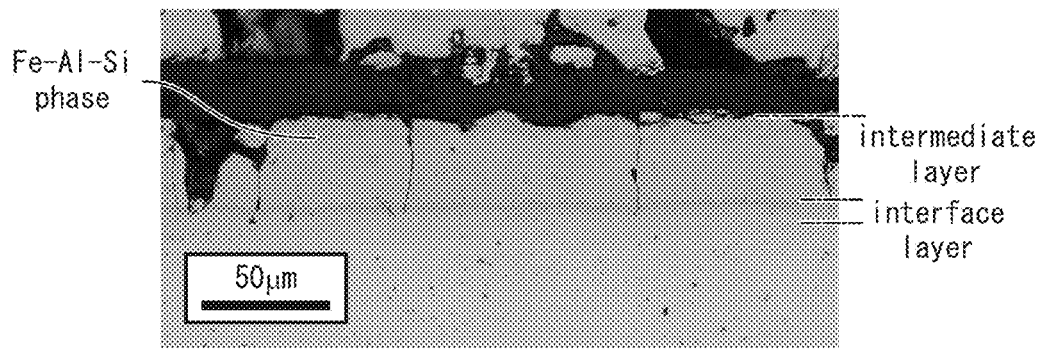
FIG. 5 is a photograph of a cross section of the Al film of a product labeled A13.

FIG. 4 is a photograph showing a cross section of the Al film of the product labeled a1. FIG. 5 is a photograph of a cross section of the Al film of the product labeled A13. As shown in FIGS. 4 and 5, for the product labeled A13, the area ratio of the Fe—Al—Si phase was lower than that for the product labeled a1. Further, the Fe—Al—Si phase was discontinuous, whereas that of the product labeled a1 had the shape of a layer (i.e., band).

Although embodiments of the present invention have been described, the above-described embodiments are merely illustrative examples useful for carrying out the present invention. Thus, the present invention is not limited to the above-described embodiments, and the above-described embodiments, when carried out, may be modified as appropriate without departing from the spirit of the invention.

REFERENCE SIGNS LIST

1, 9: hot-stamped product
1A: plated steel member
10: steel substrate
20: Al film
21: interface layer
22: intermediate layer
22a: Fe—Al—Si phase
22b: Al—Fe phase
23: oxide layer
30: Al—Si plating layer
35: Al—Si—Fe alloy layer

The invention claimed is:

1. A hot-stamped product comprising:
   a steel substrate; and
   an Al film formed on the steel substrate,
   the Al film including:
   an interface layer located at an interface with the steel substrate and having a structure with part of αFe substituted by Al and Si;
   an intermediate layer formed on the interface layer; and
   an oxide layer formed on the intermediate layer,
   a thickness of the intermediate layer being not smaller than 15 μm,
   the intermediate layer including an Fe—Al—Si phase having a structure with part of αFe substituted by Al and Si,
   the Fe—Al—Si phase including one or more elements selected from the group consisting of Zr, Ce, Y, Ta, Ni, Cu, Nb, Co, and V,
   an Si content of the Fe—Al—Si phase being 1 to 20 mass %, a total content of Zr, Ce, Y, Ta, Ni, Cu, Nb, Co, and V being 0.10 to 5.0 mass %,
   the oxide layer including one or more elements selected from the group consisting of Be, Mg, Ca, Sr, Ba, Sc and Zn,
   a total proportion of Be, Mg, Ca, Sr, Ba, Sc and Zn in a composition of the oxide layer excluding oxygen being 0.01 to 80.0 mass %.

2. The hot-stamped product according to claim 1, wherein an area ratio of the Fe—Al—Si phase in the intermediate layer is 5 to 35%.

3. The hot-stamped product according to claim 1, wherein a thickness of the oxide layer is 0.01 to 1.0 μm.

4. The hot-stamped product according to claim 1, wherein:
   a content of Ni in the Fe—Al—Si phase is 0.10 to 5.0 mass %; and
   a proportion of Mg in a composition of the oxide layer excluding oxygen is 0.01 to 80.0 mass %.

5. The hot-stamped product according to claim 3, wherein:
- a content of Ni in the Fe—Al—Si phase is 0.10 to 5.0 mass %; and
- a proportion of Mg in a composition of the oxide layer excluding oxygen is 0.01 to 80.0 mass %.

* * * * *